United States Patent
Feigel et al.

(12)

(10) Patent No.: US 6,206,485 B1
(45) Date of Patent: Mar. 27, 2001

(54) ELECTRONICALLY CONTROLLED MOTOR VEHICLE BRAKING FORCE DISTRIBUTOR

(75) Inventors: Hans-Jorg Feigel, Rosbach; Hans W. Bleckmann, Bad Nauheim, both of (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/142,366

(22) PCT Filed: Feb. 14, 1997

(86) PCT No.: PCT/EP97/00695

§ 371 Date: Dec. 30, 1998

§ 102(e) Date: Dec. 30, 1998

(87) PCT Pub. No.: WO97/29934

PCT Pub. Date: Aug. 21, 1997

(30) Foreign Application Priority Data

Feb. 15, 1996 (DE) .............................. 196 05 552

(51) Int. Cl.⁷ ..................................................... B60T 8/39
(52) U.S. Cl. ..................... 303/113.5; 303/186; 303/9.62
(58) Field of Search ............................. 303/116.1, 116.2, 303/113.1, DIG. 11, 9.62, 186, 113.5

(56) References Cited

U.S. PATENT DOCUMENTS

| 5,213,399 | * | 5/1993 | Burgdorf et al. | 303/116.2 |
|---|---|---|---|---|
| 5,215,359 | * | 6/1993 | Burgdorf et al. | 303/DIG. 11 |
| 5,290,098 | * | 3/1994 | Burgdorf et al. | 303/116.2 |
| 5,332,304 | * | 7/1994 | Maas | 303/116.2 |
| 5,403,077 | * | 4/1995 | Burgdorf et al. | 303/113.1 |
| 5,564,798 | * | 10/1996 | Zaviska et al. | 303/116.1 |
| 5,927,828 | * | 7/1999 | Beck | 303/113.2 |

FOREIGN PATENT DOCUMENTS

| 3301945 | 7/1984 | (DE) . |
|---|---|---|
| 3301948 | 7/1984 | (DE) . |
| 3706397 | 9/1988 | (DE) . |
| 3728480 | 1/1989 | (DE) . |
| 3940427 | 6/1991 | (DE) . |
| 4109460 | 9/1992 | (DE) . |
| 4213198 | 10/1993 | (DE) . |
| 4417935 | 11/1995 | (DE) . |
| 2684946 | 6/1993 | (FR) . |

* cited by examiner

*Primary Examiner*—Matthew C. Graham
*Assistant Examiner*—Robert A. Siconolfi
(74) *Attorney, Agent, or Firm*—Rader, Fishman, Grauer PLLC

(57) ABSTRACT

The present invention relates to an electronically controlled brake force distributor for automotive vehicles, which includes a pedal-operated braking pressure generator (1) to which wheel brakes (HL, VR, HR, HL) are connected by way of pressure fluid lines. At least one valve (10) is inserted into the pressure fluid lines and positioned in the pressure fluid conduit to the rear-wheel brakes. An actuator (5) is provided to actuate the valve (10) and, as a function of the vehicle deceleration, switches the valve (10) from a first into a second position in which the valve (10) is switched from its open initial position to a position separating the rear-wheel brake (HR; HL) hydraulically from the braking pressure generator (1). In this separating position, the rear-wheel brake (HR; HL) is hydraulically connected exclusively to an accumulator chamber (6) associated with the actuator (5).

8 Claims, 2 Drawing Sheets

ELECTRONICALLY CONTROLLED MOTOR VEHICLE BRAKING FORCE DISTRIBUTOR

The present invention relates to an electronically controlled brake force distributor for automotive vehicles according to the preamble of patent claim 1.

A brake force distributor of this type is disclosed in German published patent application No. 33 01 948. In this brake system, an electromagnetically operable, normally-closed valve is inserted into the pressure fluid conduit which leads to the rear-wheel brakes. This valve is switched to open by way of a variable pulse train during each braking operation. Wheel slip occurs at the rear wheels which is limited to a predetermined percentage of the front-wheel slip. When the brake circuits have a diagonal allotment, a similar valve or a valve which is controlled hydraulically as a function of the pressure in the rear-wheel brake of the first circuit is also arranged in the pressure fluid conduit to the second rear-wheel brake. When the power supply fails, it is only possible to brake the front wheels in this prior art system.

An object of the present invention is to eliminate this drawback and to develop an electronically controlled brake force distributor by simple and functionally reliable means and by properly utilizing the adherence between the road surface and the rear wheels, which enables the rear wheels to effectively contribute to the deceleration of the vehicle even in the event of malfunctions in the electric components or circuits.

According to the present invention, this object is achieved in a brake force distributor of the generic type by the characterizing features of patent claim 1. Further features, advantages and possible applications of the present invention can be seen hereinbelow in the subclaims and the description of several embodiments.

Figure 1:
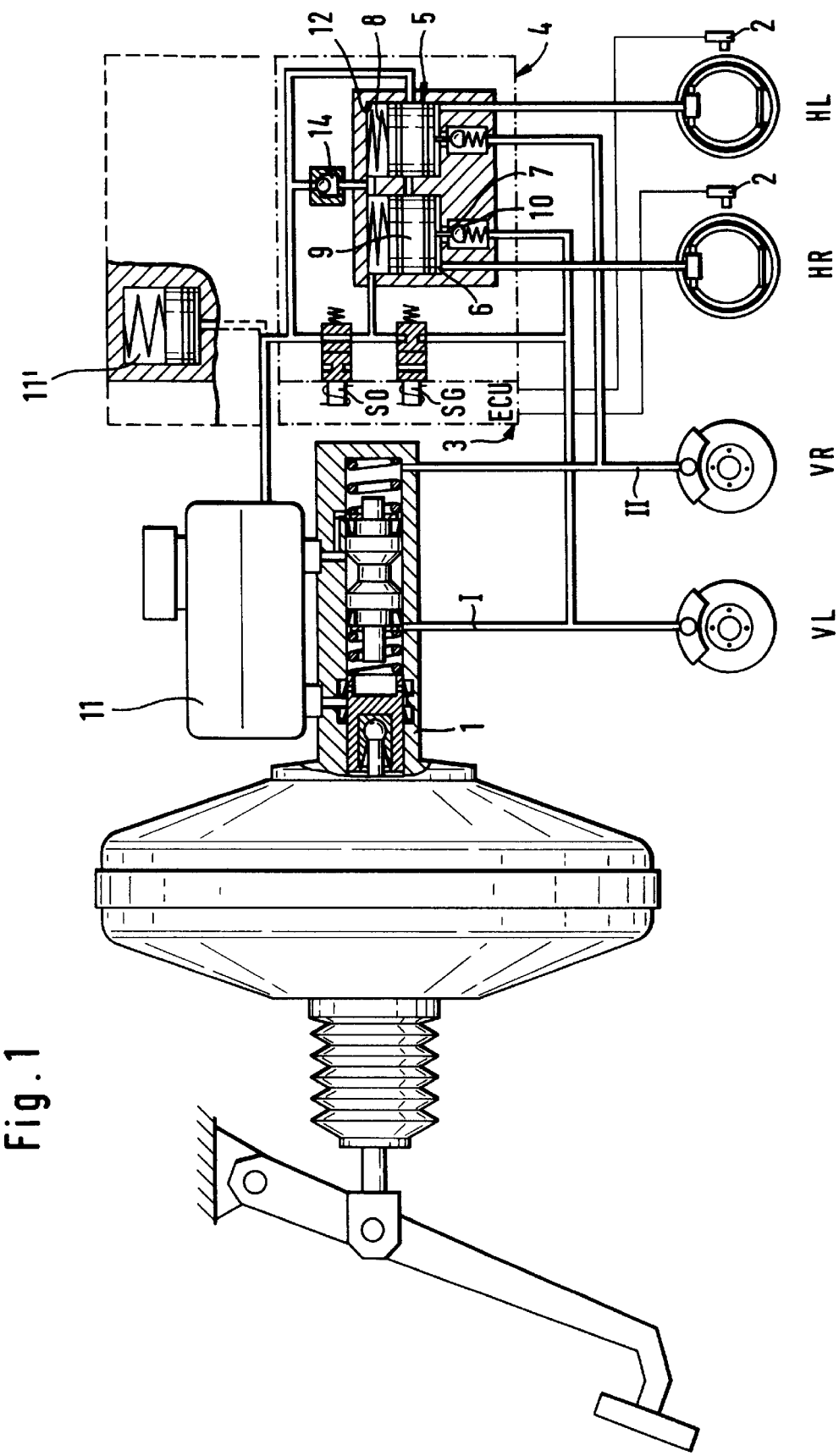
FIG. 1 is a view of a first embodiment of an electronically controlled brake force distributor with an electrohydraulic blocking device.

The FIG. 1 embodiment shows a schematic view of a dual-circuit brake system without a pump in a diagonal brake circuit split-up for automotive vehicles. Interposed between a braking pressure generator 1 and rear-wheel brakes HR, HL of two brake circuits I, II, the brake system has a valve and actuator means in a housing 4 which includes a magnetic valve SO, which is open in its deenergized initial position, and a shut-off valve SG, which is closed in its deenergized position, for both rear-wheel brake circuits I, II in order to influence modulation of the braking pressure of the rear axle. The normally-closed shut-off valve SG is connected to brake circuit I, for example, independent in terms of effect of the normally-open magnetic valve SO. The normally-open magnetic valve SO, however, is inserted into a line which connects a pressure supply reservoir 11 to two chambers 12 of the actuator means. Chambers 12 are normally filled with pressure fluid of the supply reservoir 11. Both chambers 12 are incorporated in a twin arrangement within a housing 4 and have stroke pistons 9 which are used to actuate valves 10 arranged in the rear-axle brake circuits I, II. The stroke pistons 9 maintain the valves 10 configured as non-return valves in their open position by the effect of compression springs 8 installed in the chambers 12. Each of the non-return valves is supported on the end surfaces of the stroke pistons 9 by way of a tappet. The valve seats 7 of the valves 10 are arranged between the stroke pistons 9 and the valves 10 in the area of the bore step in the housing. The tappets of the valves 10 extend through the valve seat openings to the stroke pistons 9. Interposed between each valve seat 7 and each stroke piston 9 is a variable accumulator chamber 6 through which there is a hydraulic connection of a brake circuit I, II between the braking pressure generator 1 and a rear-wheel brake HR, HL when valve 10 is open. Chambers 12 which are connected to the pressure fluid supply reservoir 11 by means of a magnetic valve SO, which is open in its initial position, form a hydraulic blocking device for the stroke pistons 9 which act as actuator when the magnetic valve SO is closed. The shut-off valve SG which separates the chambers 12 from the braking pressure generator 1 ensures a reincrease of braking pressure in the rear-wheel brakes HR, HL after a braking pressure reduction in the rear-wheel brakes HR, HL when the stroke pistons 9 adopt their position remote from the valves 10 in opposition to the effect of the compression springs 8. As soon as the braking pressure propagates via the electromagnetically opened shut-off valve SG into the chambers 12 due to the actuation of the braking pressure generator 1, the stroke pistons 9 will adopt their initial position which opens the valves 10. This permits propagation of the pressure of the braking pressure generator 1 through the accumulator chambers 6 to the rear-wheel brakes HR, HL. In order to prevent undesirable discharge of pressure fluid of the braking pressure generator 1 into the pressure fluid supply reservoir 11, the magnetic valve SO adopts its closed position as long as the shut-off valve SG connects the chambers 12 to the braking pressure generator 1.

It can be seen in the embodiment of FIG. 1 that in a diagonal allotment of the brake circuits I, II, the two actuators 5, designed according to the plunger concept, are mounted in a twin arrangement in a housing 4 along with the magnetic valve SO and the shut-off valve SG. In addition, a controlling and evaluating electronic unit 3 in a modular assembly is arranged on the housing 4 (as shown schematically). To achieve a compact brake system design, the braking pressure accumulator 1 can alternatively form an integral unit together with the assembly comprised as electronic rear-axle braking pressure control system in the housing 4.

In the FIG. 1 embodiment, sensors 2 are allocated to the rear wheels for the purpose of electronically influencing the rear-axle braking pressure. The output signals of sensors 2 relay as input signals the rotational speed or rotational deceleration of the rear wheels to the controlling and evaluating electronic unit 3. As an alternative and as a supplement to the sensors 2, a travel switch sensing the actuation of the working pistons can be provided on the braking pressure generator 1. This travel switch is not referred to in detail in the embodiment at issue.

The operation of the present invention will be discussed in the following beyond the arrangement of the structural details in terms of circuitry. The brake system is dimensioned so that the braking pressure increase in all wheel brakes VL, VR, HR, HL associated with the brake circuits I, II is exclusively performed in dependence on the braking pressure generated in the braking pressure generator 1. In FIG. 1, the brake release position is shown where pressure compensation occurs from the wheel brakes HR, HL of the rear axle to the braking pressure generator 1 and, thus, the pressure fluid supply reservoir 11 by way of the valve 10 which is opened by the spring-force-applied stroke piston 9. The wheel brakes VL, VR of the front axle have a direct pressure fluid connection to the braking pressure generator 1 corresponding to the brake circuit arrangement (as shown). When the braking pressure generator 1 is actuated and an allowable deceleration threshold of the vehicle is exceeded, the controlling and evaluating electronic unit 3 causes the electromagnetic valve SO, which is open in its initial position, to adopt its closed position. This is in contrast to the illustration in FIG. 1. Thus, a pressure fluid volume which is originally supplied from the pressure fluid supply reservoir 11 to the two chambers 12 is compressed in the chambers 12, with the result that the stroke pistons 9 remain in their initial position (as shown in the drawing) where the open valves 10 permit an unimpeded pressure fluid connection via the accumulator chambers 6 to the rear-wheel brakes HR, HL. The rear-wheel braking pressure corresponds to the front-wheel braking pressure and can be increased until the rotational acceleration of a rear wheel exceeds an allowable limit value. Due to the signal processing in the controlling and evaluating electronic unit 3, the normally-open magnetic valve SO is moved to adopt its open position again. This removes the blocking effect from the stroke piston 9 and closes the valves 10 as soon as the stroke pistons 9 have moved away from the tappets of the valves 10. The volume in the accumulator chambers 6 increases simultaneously with the closing of the valves 10 and the return movement of the stroke pistons 9 in the direction of the compression springs 8 so that the pressure fluid volume of the rear-wheel brakes HR, HL escapes into the expanded accumulator chambers 6 to achieve pressure reduction in the rear-wheel brakes. The pressure is reduced and the stroke pistons 9 recede when the amount of locking pressure on the rear-wheel brakes HR, HL is in excess of the preloading pressure of the compression springs 8 in the chambers 12. The preloading pressure of the compression springs 8 is rated so that it is below the ideal braking pressure distributor characteristic curve of the unloaded vehicle. From this follows that braking pressure reduction in the rear-wheel brakes is impossible only when the front wheels, according to their dimensioning, lock as well. The subject matter of the present invention, in terms of its function, is not different from previously known, conventional braking pressure controllers. At locking pressures in the rear-wheel brakes HL, HR which exceed the preloading pressures of the compression springs 8, the rear-wheel braking pressure can be reduced up to the maximum preloading pressure of the compression springs 8. Upon failure of the electric energy supply which would cause inactivity of the magnetic valve SO and the shut-off valve SG, this reduces the rear-wheel braking pressure to the preloading pressure of the compression springs 8 which is generally at a rate remote from the locking threshold. Upon actuation of the braking pressure generator 1, the valves 10 can then isolate the hydraulic connection to the rear-wheel brakes HR, HL by receding movement of the stroke pistons 9. When the electronics fails, at most the preloading pressure will occur in brakes HR, HL to the effect of a pressure-limitor function. Under the condition that the electrical or electronic system is intact, pressure reincrease occurs in the rear-wheel brakes HR, HL by electrically actuating the shut-off valve SG to assume its open position where the pressure of the braking pressure generator 1 is not impeded to propagate into the chambers 12 of the actuators 5. As a result, the stroke pistons 9 crack the valves 10 open.

To prevent a hydraulic connection between the actuators 5 and the pressure fluid supply reservoir 11, which is open with respect to the atmosphere, alternatively, a closed pressure fluid supply reservoir which takes the shape of a low-pressure accumulator 11' can be used. This alternative connection is also indicated in dotted lines in FIG. 1. To ensure that the chambers 12 are filled, a non-return valve 14 which opens in the direction of the chambers 12 is arranged in parallel to the magnetic valve SO. The structural volume of the housing 4 can be reduced drastically when the rear-wheel brakes HR, HL are supplied with pressure fluid by one single brake circuit which leads to the rear axle. The reason is that both rear-wheel brakes can be connected hydraulically to the braking pressure generator 1 by way of one single actuator 5.

Figure 2:
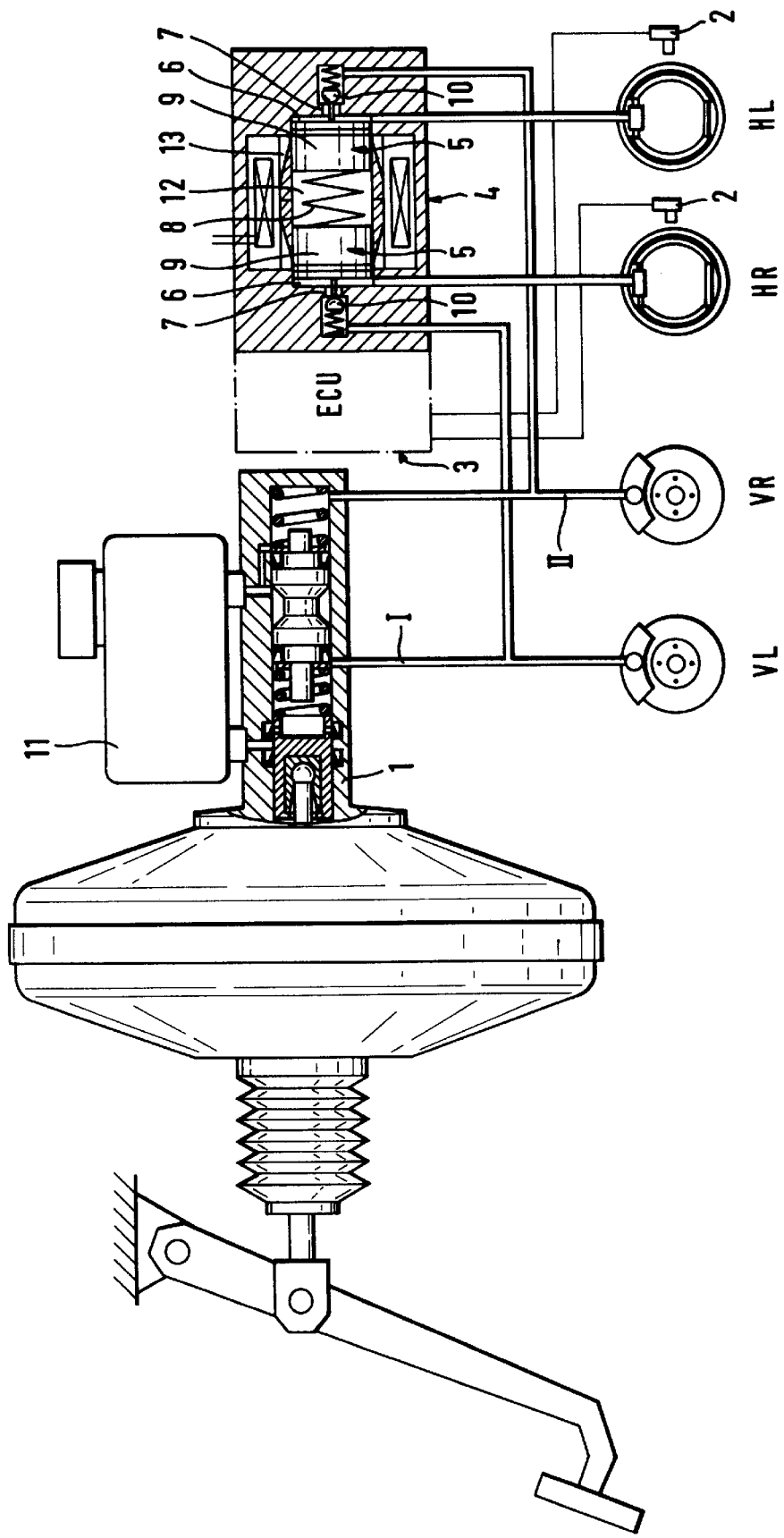
FIG. 2 is a view of another preferred embodiment of an electronically controlled brake force distributor with an electromechanical blocking device.

Another preferred embodiment of the subject matter of the present invention can be seen in FIG. 2. Different from the design in FIG. 1, exclusively one chamber 12 is required in FIG. 2 for a brake system in a diagonal circuit split-up because both stroke pistons 9 extend in a diametral arrangement within one jointly used housing bore. The chamber 12 and the only compression spring 8 is interposed between the two stroke pistons 9, with the result of a particularly compact construction. In order to obviate the need for the hydraulic connection between the pressure fluid supply reservoir 11 via a magnetic valve to the chamber 12, and to economize the double sealing of each stroke piston 9 with respect to FIG. 1, the present invention discloses in FIG. 2 the use of an electromechanically operable blocking device which, in the capacity of a friction brake, makes catch at the peripheral surfaces of the two stroke pistons 9 in the embodiment shown. If not all the details of the construction shown in FIG. 2 are referred to, they correspond in their essence to the explanations about the design and operation of the brake system with respect to FIG. 1. The omission of the shut-off valve SG illustrated in FIG. 1 represents a structural and functional feature which distinguishes the subject matter of FIG. 2 from the subject matter of FIG. 1. In a loaded vehicle, this may cause underbraking of the rear axle in specific situations. However, this can be avoided by an appropriate actuation method by preventing pressure reduction on the rear-wheel brakes HR, HL when the brake is operated on the basis of low friction values on the front-wheel brakes VL, VR. In the present embodiment of FIG. 2, the blocking device would be active in this case, with the result that the stroke pistons 9 and valves 10 remain in an initial position (as shown) which safeguards the hydraulic connection between the braking pressure generator 1 and the rear-wheel brakes HR, HL. According to the present invention, another measure to prevent underbraking of the rear axle uses the rotational speed signals of the front wheels, assisted by the respectively determined reference speed, to actuate the rear-wheel brakes. Another counteraction taken to prevent underbraking of the rear axle chooses a retarded pressure reduction in the rear-wheel brakes (possibly according to the 'select-high' principle) if the front wheels VL, VR lock.

List of Reference Numerals:
1. braking pressure generator
2. sensor
3. controlling and evaluating electronic unit
4. housing
5. actuator
6. accumulator chamber
7. valve seat
8. compression spring
9. stroke piston
10. valve
11. pressure fluid supply reservoir
12. chamber
13. blocking device
14. non-return valve

What is claimed is:

1. Electronically controlled brake system, comprising:
   a pedal-operated braking pressure generator to which wheel brakes are connected by way of pressure fluid lines,
   at least one valve inserted into the pressure fluid lines, which switches from a first position into a second position as a function of the vehicle deceleration and is arranged in the pressure fluid conduit to the rear-wheel brakes, wherein a stroke piston acted upon by a compression spring is provided to actuate the valve,
   sensors to measure the individual wheel rotational behavior and/or corresponding average values and a controlling and evaluating electronic unit to combine and process the sensor signals and to generate control signals which are used to actuate the valve and permit controlling the braking pressure in the rear-wheel brakes, wherein the valve is maintained open in the initial position by the stroke piston,
   means for blocking the stroke piston in a position in which the valve adopts its open initial position to adapt the rear-wheel braking pressure to the level of the front-wheel braking pressure,
   and in that upon actuation of the braking pressure generator the valve is switched from its open initial position to a position in which the rear-wheel brake is separated hydraulically from the braking pressure generator, in which separating position the rear-wheel brake for braking pressure reduction is hydraulically connected exclusively to an accumulator chamber, expanded in volume, as soon as the rotational acceleration of one of the rear wheels exceeds the admissible limit value, wherein the means for blocking the stroke piston forms a blocking device which has a closable chamber that is connected to a pressure fluid supply reservoir by way of a magnetic valve switched open in its initial position.

2. Brake force distributor as claimed in claim 1, wherein the stroke piston, on its one piston end surface is confined by the accumulator chamber, and the piston end surface remote from the accumulator chamber is confined by a chamber.

3. Brake force distributor as claimed in claim 1, wherein the stroke piston, by the action of a compression spring in a chamber, urges the valve into its open position where it establishes an unimpeded pressure fluid connection between the braking pressure generator and the rear-wheel brake by way of the accumulator chamber.

4. Brake force distributor as claimed in claim 1, wherein the chamber is hydraulically connected to a braking pressure generator by means of a shut-off valve which is adapted to be switched electromagnetically to its open position.

5. Brake force distributor as claimed in claim 1, wherein the valve is configured as a non-return valve adapted to close in the direction of the rear-wheel brake.

6. Brake force distributor as claimed in claim 1, wherein the rear-wheel brakes are arranged in a diagonal brake circuit and include an actuator with two parallel arranged stroke pistons, which actuator reduces inadmissibly high braking pressures in the rear-wheel brakes to the respective preloading pressure of the compression springs that are supported on the two stroke pistons.

7. Brake force distributor as claimed in claim 6, wherein the preloading pressure of the compression spring is lower than a rear-axle braking pressure which results from the ideal braking pressure distributor characteristic curve of an unloaded automotive vehicle.

8. Electronically controlled brake system, comprising:
   a pedal-operated braking pressure generator to which wheel brakes are connected by way of pressure fluid lines,
   at least one valve inserted into the pressure fluid lines, which switches from a first position into a second position as a function of the vehicle deceleration and is arranged in the pressure fluid conduit to the rear-wheel brakes, wherein a stroke piston acted upon by a compression spring is provided to actuate the valve,
   sensors to measure the individual wheel rotational behavior and/or corresponding average values and a controlling and evaluating electronic unit to combine and process the sensor signals and to generate control signals which are used to actuate the valve and permit controlling the braking pressure in the rear-wheel brakes, wherein the valve is maintained open in the initial position by the stroke piston,
   means for blocking the stroke piston in a position in which the valve adopts its open initial position to adapt the rear-wheel braking pressure to the level of the front-wheel braking pressure,
   and in that upon actuation of the braking pressure generator the valve is switched from its open initial position to a position in which the rear-wheel brake is separated hydraulically from the braking pressure generator, in which separating position the rear-wheel brake for braking pressure reduction is hydraulically connected exclusively to an accumulator chamber, expanded in volume, as soon as the rotational acceleration of one of the rear wheels exceeds the admissible limit value, wherein the rear-wheel brakes are arranged in a diagonal brake circuit and include an actuator with two parallel arranged stroke pistons, which actuator reduces inadmissibly high braking pressures in the rear-wheel brakes to the respective preloading pressure of the compression springs that are supported on the two stroke pistons, wherein the preloading pressure of the compression spring is lower than a rear-axle braking pressure which results from the ideal braking pressure distributor characteristic curve of an unloaded automotive vehicle.

* * * * *